Dec. 1, 1959    L. A. DE ROSA ET AL    2,915,750
RADIO NAVIGATION BEACON
Filed July 12, 1957    2 Sheets-Sheet 1
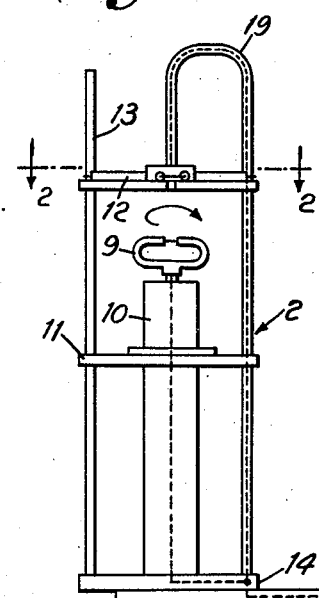
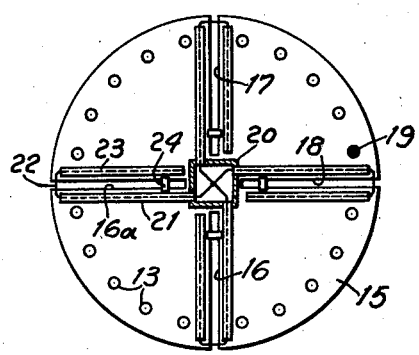
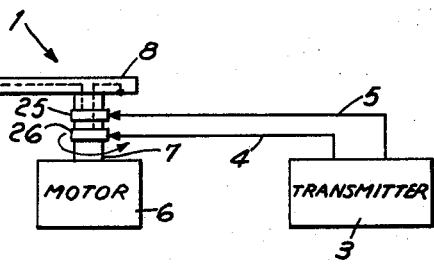
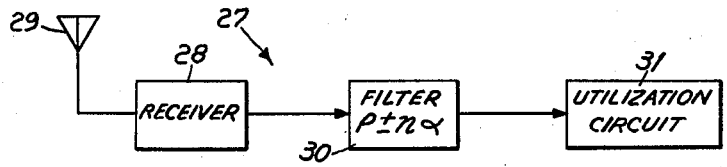
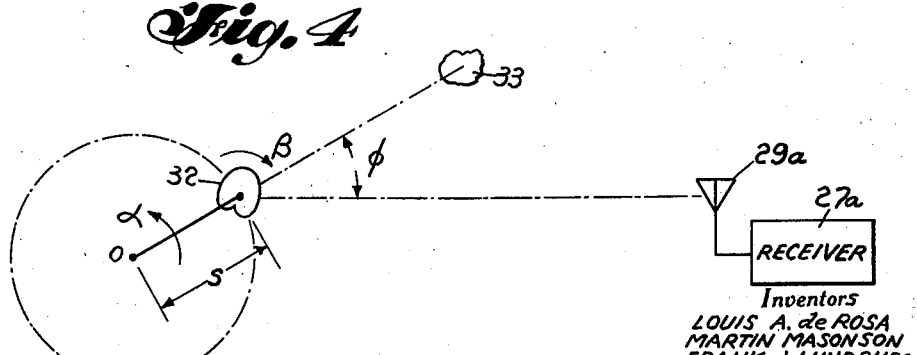
Inventors
LOUIS A. de ROSA
MARTIN MASONSON
FRANK J. LUNDBURG
By
Attorney Dec. 1, 1959   L. A. DE ROSA ET AL   2,915,750
RADIO NAVIGATION BEACON
Filed July 12, 1957   2 Sheets-Sheet 2
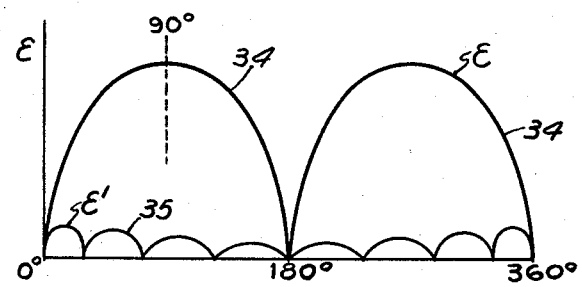
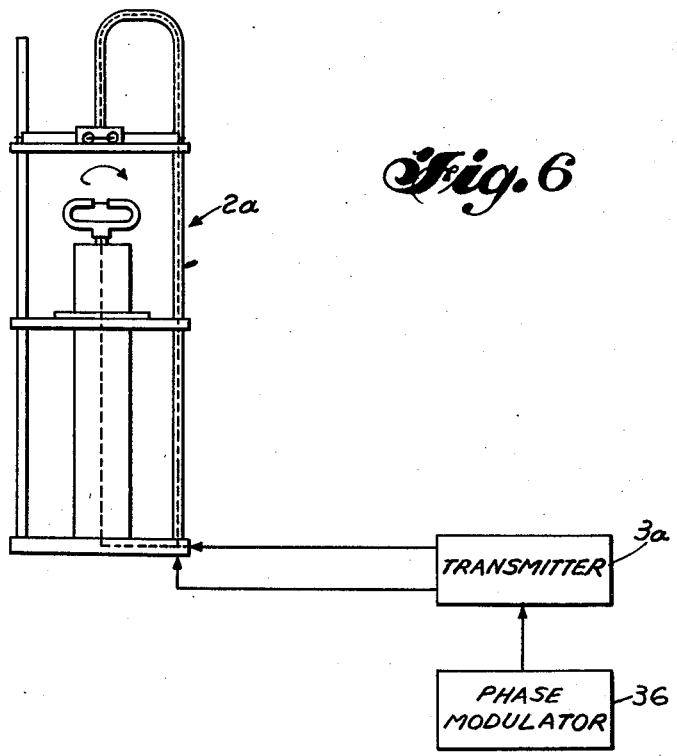
Inventors
LOUIS A. de ROSA
MARTIN MASONSON
FRANK J. LUNDBURG
By
Attorney

2,915,750
RADIO NAVIGATION BEACON

Louis A. De Rosa, Upper Montclair, Martin Masonson, Nutley, and Frank J. Lundberg, Newark, N.J., assignors to International Telephone and Telegraph Corporation, Nutley, N.J., a corporation of Maryland Application July 12, 1957, Serial No. 671,435

4 Claims. (Cl. 343—106)

This invention relates to radio navigation beacons and more particularly to a beacon with variable phase radio frequency carrier.

In radio navigation systems such as VOR and TACAN, accuracy of bearing indication is obviously of prime importance since any error introduced therein will give an airplane using this system a false bearing position. One of the principal sources of such errors is the reflection of signals from obstacles such as terrain, buildings, and the like. It is well known that the radio frequency phase difference between the carrier directly radiated and the one reflected to a receiving point influences the size of error in an estimation of the azimuth, just as the phase difference in the modulations on these carriers. The obstacle "generates" a ghost, the reflected signal of the desired transmitted signal, whose radio frequency phase relative to the desired signal could be anything. It could be such as to produce a large azimuth error at the receiver, or a small one, and even zero azimuthal error. Whatever it is, it is a certain error depending on the given relative displacement of transmitter, receiver and obstacle. But suppose the transmitter position changes somewhat. It does not have to move far to make a radical change in the electrical and hence effective displacements of the transmitter, receiver and obstacle. The azimuthal error would now, generally, be different from its previous value, that is, before the change in position. If it were large before, it may now be small or anything else. Now consider varying the transmitter position locally about some point. With each configuration of transmitter, obstacle, and receiver, a certain azimuthal error is incurred. An average estimate of azimuth can be found. The azimuth so determined will, in general, have a smaller variance, which is to say, will be more accurate. One embodiment of this principle would be to have a multiplicity of identical antennas spaced in some definite arrangement, and switch from one antenna to another in some definite sequence. Of course, the receiver would have to know the transmitting program to separate out the individual contributions from each transmitter. This is, however, too complicated and expensive for practical use. Actually, we provide the receiver with a continuous stream of azimuthal data, which at each instant (as against discrete changes in transmission) is differently corrupted by the ghost signal. The receiver operates on this data and produces an average estimate of azimuth. However, care must be taken with the transmitted signal in order not to introduce error that would not occur were the antenna stationary.

It is therefore an object of this invention to provide a radio navigation beacon wherein the transmitting antenna or the radiation therefrom is continuously varied in position or character at the same time without requiring any complicated modification of conventional receivers.

It is a further object to provide a radio navigation beacon having a directional rotating antenna wherein means are provided to phase modulate the radio frequency carrier.

It is still a further object to provide a radio navigation beacon wherein a directional antenna spins about its own axis and during said spin the antenna is rotated about a second axis at a different rate of speed.

A feature of this invention is the provision in a radio navigation beacon of an antenna transmitting a rotating directive pattern, and means associated with said antenna to phase modulate the radio frequency carrier of the beacon.

Another feature is that the phase modulation of the radio frequency carrier is obtained by rotating the antenna about an axis displaced from the vertical axis of the antenna.

The above-mentioned and other features and objects of this invention will become more apparent by reference to the following description taken in conjunction with the accompanying drawings, in which:

Fig. 1 is one embodiment of this invention;
Fig. 2 is a view along line 2—2 of Fig. 1;
Fig. 3 is the receiving system for use with the transmitter of Fig. 1;
Fig. 4 is a view illustrating the space relations between the transmitting antenna, receiver and an obstacle;
Fig. 5 is a graph of the reflection error versus the angle between the lines joining transmitter to receiver and transmitter to obstacle; and
Fig. 6 is another embodiment of this invention.

Referring now to Figs. 1 and 2, there is shown an omni-directional radio navigation beacon 1 consisting of a transmitting antenna 2, such as is used in the VOR navigation system, a transmitter 3 coupled to the antenna 1 by leads 4 and 5, and a motor 6 coupled to the antenna 1 by means of shaft 7 and a boom 8. The antenna 1 includes a small rotatable dipole 9, driven by a motor 10 which is supported on a dielectric platform 11. The dipole is rotated to produce a rotating figure of 8 radiation. Above the dipole 9 is a loop antenna 12 adapted to produce a circular radiation. The platform 11 and the loop antenna 12 are supported by rods 13 coupled to a base support 14 to which the boom 8 is attached. The loop antenna 12 is in the form of a slotted disk which may be adjusted vertically on the rods 13 to provide the desired resonance loading for the dipole 12 and thereby compensate for the capacitive reactance thereof and thus obtain radiation efficiency.

For a more complete understanding of the structural details of the loop antenna 12, reference should be made to Fig. 2. The conductive disk 15 is circular and made up of copper, brass, aluminum or other conductive material. The disk is provided with four radial slots, 16, 16a, 17 and 18, disposed at right angles thereby dividing the disk into four equal sectors. Any number of slots, however, could be employed, the number being determined to insure a constant current distribution for a given diameter disk. These slots may not be straight and radial but may be of other configurations so long as all of the slots contained in the antenna disk are of substantially the same configuration. The loop antenna is fed by applying a potential across the four slots at the peripheral portion of the disk. The coaxial line 19 is brought to the center of the disk to a junction box 20, whereby the feed is divided between the four slots, each slot being fed by a coaxial line 21 extending from the box 20 to the outer end of the slot where the inner conductor 22 is exposed crosswise of the slot. A second length of coaxial line 23 extends beyond the exposed center conductor 22 and constitutes an open end coaxial stub for matching purposes. It will thus be apparent that each of the four slots is fed at the outer end thereof, and that the feeding thereof is cophasal. The electrical length of the slots 16, 16a, 17, and 18 is determined by shorting bars such as indicated at 24, the shorting bars being adjustable so that a substantially perfect circular radiation can be obtained. The coaxial lines 21 and 23 for each slot may be varied in length to satisfy the impedance at the junction box 20. The coaxial line 23 is usually an open end line to provide capacitive impedance to nullify the inductive reactance of the loop.

The rotating dipole antenna 9 is driven clockwise by the motor 10 at a speed in the VOR system of 30 cycles per second, which amplitude modulates the radio frequency carrier signal generated by the transmitter 3. The antenna 2 is simultaneously rotated counterclockwise about the axis of the motor 6 at a speed less than 30 cycles per second determined by mechanical reasons, such as the weight of the transmitting antenna and the length of the boom 8. The carrier signal passing through leads 4 and 5 is transferred to the loop antenna 12 and the dipole antenna 9 by means of slip rings 25 and 26. The receiving system 27, shown in Fig. 3, comprises a conventional receiver 28 coupled to a receiving antenna 29. The receiver 28 is coupled to a filter 30 and the output of the filter 30 is fed into a utilization circuit 31.

The operation of the beacon can be explained more thoroughly with reference to Figs. 4 and 5. A rotating cardioid 32 is generated by the rotating dipole antenna 9 and the fixed loop antenna 12. Obstacle 33 reflects some part of the transmitted signal striking thereon to the receiver 27a. The angle subtended by the lines joining the receiver 27a and the obstacle 33 to the antenna pattern 32 is designated by the symbol $\varphi$. The rate of rotation of the antenna about its own axis clockwise is $\beta$, the rate of rotation of the antenna about an axis $o$ at a distance $s$ from the antenna is $\alpha$ and opposite in direction to $\beta$. First let us consider the case where $\alpha$ is not present and the dipole rotates only about its own axis. In the ordinary VOR or TACAN (fundamental or course bearing indication) systems, the azimuth error has a maximum value $\epsilon$ given by $$\epsilon = a_k \sin \varphi \text{ radians}$$

where $a_k$ is the relative strength of the reflected signal and $\varphi$, as before explained, is the angle to the reflecting obstacle measured from the line of sight to the receiver. The curve 34 of this error is shown in Fig. 5. The maximum value of $\epsilon$ occurs at 90 degrees and 270 degrees and the minimum value occurs at 0 degree, 180 degrees and 360 degrees. Now let us consider the case where in addition to the rotation rate $\beta$ of the antenna about its own axis, it is also rotating about the axis $o$ at the distance $s$ from the antenna at a rate $\alpha$. The difference rate $\beta-\alpha$ will be the effective rate of amplitude modulation as the receiver sees it. Let that rate be $\rho$. The rate $\rho$ is so chosen that the receivers used in VOR and TACAN can use the system described here without any change except for the addition of filter 30. As heretofore explained, the rate chosen for $\alpha$ depends on practical and mechanical factors. It may be one revolution per second or even five revolutions per second as may be feasible. $\beta$ is then adjusted to give the correct modulation rate $\rho$. In the case of VOR $\rho$ corresponds to 30 cycles per second. In this case we have a maximum error $\epsilon'$ which is $$\epsilon' = J_0(A)\epsilon$$

where $$A = \left(2\pi \sin \frac{\phi}{2}\right)\left(\frac{2s}{\lambda}\right)$$

$s=$ the radius of the circular path and $\lambda$ equals the radio frequency wave length. As a specific example, consider the case of VOR with a reflecting obstacle at 1000 feet from the transmitter. For VOR $\lambda$ equals 10 feet. Taking $s=8$ feet, then $$\frac{2s}{\lambda} = 1.6$$

For this condition of eccentric rotation plus rotation of the antenna about its axis, the maximum error is approximately ⅛ the maximum error with a stationary antenna, which maximum $\epsilon'$ occurs at about $\varphi=15$ degrees and $\varphi=345$ degrees, as compared to 90 degrees and 270 degrees for the stationary antenna. However, in the case of the moving antenna, the receiver video signal beyond the second detector will consist of many harmonics of the rate frequency $\alpha$ and harmonics of the rate $\rho$. The desired information bearing signal is the one at frequency $\rho$. To extract it, it may be necessary to use a fairly selective filter 30 centered at $\rho$.

Of course, the rotation of a 100 mc. VOR structure at an 8 foot radius may in many situations not prove feasible. At higher frequencies, all dimensions become proportionately "scaled down" leading to quite manageable structures. For example, the same error reduction noted above occurs in TACAN (fundamental or course bearing indication) at a radius of 0.8 feet, since TACAN wave lengths are about 1 foot.

It should be understood that the movement of the transmitting antenna 2 along a circular path is not the essential factor reducing the error, but rather it is the variability in the phase difference between transmitted and reflected signals at the receiver. A similar reduction in error can be achieved by a direct phase modulation of the radio frequency carrier, instead of locally varying the antenna position. This embodiment is shown in Fig. 6, where there is illustrated a transmitting antenna 2a, identical to the antenna 2 of Fig. 1, coupled to a transmitter 3a. The phase modulation of the radio frequency carrier is effected by phase modulator 36 coupled to the transmitter 3a. In this embodiment the maximum error would be $$\epsilon' = J_0(A)\epsilon$$

where now $$A = \left(2\pi \sin^2 \frac{\phi}{2}\right)\frac{h \cdot r}{\lambda}$$

Here $h=$maximum deviation of carrier frequency expressed as a fraction of center frequency, and $r$ is the distance to the reflecting obstacle. Clearly if $$\frac{h \cdot r}{\lambda}$$

is about the same as $$\frac{2s}{\lambda}$$

in the preceding embodiment, similar results obtain. Note that in the phase modulation embodiment the choice of $h$ for optimum results depends on having estimates of the smaller values of the possible $r$, i.e., the distance to the nearest obstacles.

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio navigation beacon comprising means for radiating energy in a directive pattern, means for applying energy of a radio frequency carrier to said radiating means, first means associated with said radiating means to effect rotation of said pattern about the axis of said radiating means at a first rate, second means to rotate said radiating means about a second axis parallel from said antenna axis at a second rate, said first rotation being simultaneous with said second rotation.

2. A radio navigation system for reduction of errors due to reflecting obstacles comprising means for radiating energy in a directive pattern, means for applying energy of a radio frequency carrier to said radiating means, first means associated with said radiating means to effect rotation of said pattern about a first axis at a first rate, second means to rotate said radiating means about a second axis parallel to said first axis at a second rate, said first rotation being simultaneous with said second rotation and a receiver to receive and detect signals from said radiated energy determining the position of said receiver relative to said radiating means.

3. A radio navigation system for reduction of errors due to reflecting obstacles comprising means for radiating energy in a directive pattern, means for applying energy of a radio frequency carrier to said radiating means, first means associated with said radiating means to effect rotation of said pattern about a first axis at a first rate, second means to rotate said pattern about a second axis displaced from said first axis at a second rate, said first rotation being coincident with said second rotation, a receiver to receive and detect signals from said radiated energy determining the position of said receiver relative to said radiating means, and filter means coupled to said receiver to remove from said signals lower order harmonics produced by said second rotation.

4. A radio navigation beacon comprising means for radiating energy in a directive pattern, means for applying energy of a radio frequency carrier to said radiating means, first means associated with said radiating means to effect rotation of said pattern about the axis of said radiating means, and means to rotate said radiating means about a second axis displaced from the axis of said radiating means to phase modulate said radio frequency carrier.

References Cited in the file of this patent
UNITED STATES PATENTS

| | | |
|---|---|---|
| 2,377,902 | Relson | June 12, 1945 |
| 2,490,050 | Hansel | Dec. 6, 1949 |
| 2,511,030 | Woodward | June 13, 1950 |
| 2,535,850 | Hammond | Dec. 26, 1950 |
| 2,547,066 | Wagner | Apr. 3, 1951 |